(No Model.)
E. H. KEISER.
PYROMETER.
No. 373,742. Patented Nov. 22, 1887.
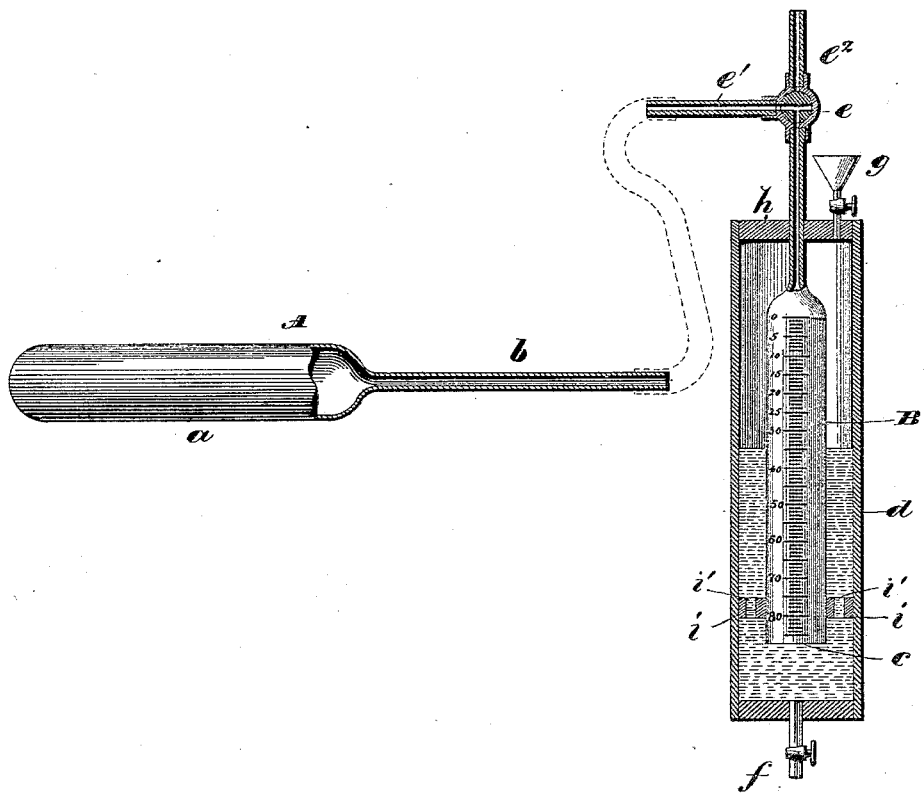

United States Patent Office.

EDWARD H. KEISER, OF BRYN MAWR, PENNSYLVANIA.

PYROMETER.

SPECIFICATION forming part of Letters Patent No. 373,742, dated November 22, 1887.

Application filed June 2, 1887. Serial No. 240,042. (No model.)

*To all whom it may concern:*

Be it known that I, EDWARD H. KEISER, a citizen of the United States of America, residing at Bryn Mawr, in the county of Montgomery and State of Pennsylvania, have invented certain new and useful Improvements in Pyrometers; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention relates to certain new and useful improvements in pyrometers for indicating the temperature of heated substances with great accuracy. It is based upon the laws of the expansion of air; and my invention consists in the construction and combination of the parts of the instrument, as will be hereinafter fully set forth, and specifically pointed out in the claims.

The principle underlying the construction of my pyrometer is as follows: If a vessel of known capacity containing air under atmospheric pressure and at a known temperature be heated to a higher temperature, a portion of the air contained in the vessel will be driven out. If the air which is thus expelled be collected in a gage and its volume measured, then it will be possible from the data which are known to calculate the temperature to which the vessel has been raised.

In the accompanying drawing I have shown a pyrometer constructed in accordance with my invention, the same being partly in section.

In the accompanying drawing, A refers to a vessel, which may be made of wrought-iron, porcelain, or platinum, according to the intensity of the heat which it is desired to measure. For temperatures below the softening-point of glass the vessel A is preferably made of hard potash glass. The vessel A is constructed so that the bulb $a$ will have a known capacity, and this bulb is provided with a tube, $b$, the bore of which is of quite small diameter, while the length may be determined by the use to which the implement is to be put.

B refers to a graduated glass gage, which is surrounded by a transparent water-vessel, $d$. This gage B is open at its lower end or bottom, $c$, and at its upper end is provided with a stem which communicates with a three-way cock, $e$. The gage is held in position by corks $h$ and $i$, and water or other liquid can be poured into the water-vessel $d$ through a funnel, $g$, and may be drawn off when desired by a cock, $f$, which is connected with the bottom of the water-vessel.

The cork $i$, which holds the gage B in place, is provided with a circumferential series of perforations, $i'$, through which the water can pass.

The three-way cock $e$ is provided with a tube, $e'$, which is connected by a suitable flexible tube to the stem $b$, and, if desirable, the stop-cock may also have a tube, $e^2$, which will open to the atmosphere.

To determine the temperature of any substance with this instrument it is necessary to bring the level of the water on the outside and inside of the gage to the zero-point. Then if both A and B have acquired the temperature of the surrounding air they are connected by means of the rubber tubing. A definite volume of air under atmospheric pressure will now be contained in the bulb A and the tube which connects the bulb with the gage. The temperature of the air confined in the apparatus is the same as that of the room in which the instrument is placed. It is read off on a scale attached to B. The bulb A is then introduced into the heated substance. Air will be driven out of the bulb into the gage. When the volume of gas in B no longer increases, water is allowed to flow out of the stop-cock at the bottom of the water-jacket until the level of the liquid is the same on the outside and inside of the casing $d$. The volume of air in the gage is then read off on the graduated tube.

I am aware that prior to my invention pyrometers have been constructed which depend for their operation upon the expansion of heated air which is caused to act upon a liquid column, and I do not claim such construction as my invention; but

What I claim as new, and desire to secure by Letters Patent, is—

1. In a pyrometer, the combination, substantially as described, of a hollow air-tight vessel or bulb, a transparent water-vessel having inlet and outlet openings, a graduated open-ended gage, B, supported within said water-vessel, and an air-tight tube connecting the bulb with gage B.

2. In combination with a bulb, A, constructed substantially as shown and provided with a tube, b, a flexible connection for connecting the same to a three-way cock, a gage consisting of a graduated vessel connecting with said three-way cock and provided with an open bottom, a water-vessel, d, having corks h and i, for holding the gage in place, the lower cork being provided with a series of perforations, cock f, and funnel g, having a cock, the three-way cock being adapted to be turned so as to admit air under atmospheric pressure either to the bulb A or gage, and adapted to be turned so as to connect the bulb A and eudiometer to each other, substantially as shown, and for the purpose set forth.

In testimony whereof I affix my signature in presence of two witnesses.

EDWARD H. KEISER.

Witnesses:
EDMUND B. WILSON,
DAVID B. WILDE.